United States Patent [19]

Staser et al.

[11] Patent Number: 5,469,664

[45] Date of Patent: Nov. 28, 1995

[54] PIVOTING BELOW BELT GLASS RUN CHANNEL

[75] Inventors: Brian H. Staser, Troy; Danny W. Figlioli, Macomb Township; Mark Manuel, Clinton Township, all of Mich.

[73] Assignee: General Motors Corporation, Detroit, Mich.

[21] Appl. No.: 337,707

[22] Filed: Nov. 14, 1994

[51] Int. Cl.[6] .................................................. E05D 15/16
[52] U.S. Cl. .................................................. 49/452; 49/502
[58] Field of Search ............................... 49/452, 375, 502, 49/376, 380; 248/222.3

[56] References Cited

U.S. PATENT DOCUMENTS

| | | | |
|---|---|---|---|
| 2,449,210 | 9/1948 | Faust | 49/452 |
| 3,180,606 | 4/1965 | Sabin et al. | 248/222.3 X |
| 3,273,286 | 9/1966 | Brissette et al. | 49/376 X |
| 4,527,760 | 7/1985 | Salacuse | 248/222.3 X |
| 4,586,290 | 5/1986 | Juechter | 49/375 X |
| 4,910,914 | 3/1990 | Asoh | 49/376 X |
| 5,251,403 | 10/1993 | Compeau et al. | 49/502 |

Primary Examiner—Philip C. Kannan
Attorney, Agent, or Firm—Jeffrey A. Sedlar

[57] ABSTRACT

A pivoting glass run channel provides the ability to pre-assemble the glass run channel to a door module in a position such that it does not interfere with insertion of the module into a vehicle door or assembly of other hardware components into the vehicle door. The pivoting glass run channel is pivotable to an operative position after mounting the module in the vehicle door.

6 Claims, 1 Drawing Sheet

PIVOTING BELOW BELT GLASS RUN CHANNEL

BACKGROUND OF THE INVENTION

The present invention relates to vehicle door modules.

Conventional vehicles employ side door assemblies having windows requiring operating hardware which is known as the window regulator. The window and regulator generally occupy a large part of the limited space available within the door assembly. Additional hardware items also conventionally reside in a vehicle door and therefore, must be assembled into the door with the window and regulator in a coordinated manner to avoid interference.

In such door assemblies the window at its fore and aft sides adjacent its bottom edge is generally slidably guided for movement through a pair of stationary guides or glass run channels mounted within the door assembly. The glass run channels engage the window as it moves between a fully open position, in which it is substantially disposed within the door assembly and a fully closed position, in which the majority of the window is located above the belt line of the door assembly.

The window is generally moved between its open and closed positions by a suitable window regulator mechanism. A commonly known type of window regulator is the crossarm window regulator. This common window regulator is operatively connected to a sash channel which is mounted to the bottom edge of the window thereby permitting the window regulator to effect raising and lowering movement of the window. The window regulator mechanism is typically manually or power operated.

A typical door system also includes interior and exterior handles and a door latch for releasably holding the door in a closed position. Both interior and exterior handles are linked to the latch mechanism to effect release thereof. Interior and exterior lock actuators are also typically provided in the door system which are operatively linked to the latch or handles to selectively prevent the handles from releasing the latch assembly to an open position.

It is known to provide a vehicle door module comprising a panel consisting of structural members and mounting plates for assembling various pieces of door hardware together in a modular form. A conventional module is comprised of a plastic or metal panel onto which the various hardware components are attached.

It is also known to integrate at least one glass run channel into the modular assembly before its installation into a vehicle. However, the integration of glass run channels into a vehicle door module prior to its assembly into the vehicle door has been limited to certain applications. This is because at times, it is not practical to assemble a module into the vehicle's door with the glass run channel attached thereto. This is generally either because the module's insertion is difficult or because the glass run channel interferes with the assembly of other components into the vehicle door when it is pre-attached to the module. Therefore, the benefit of integrating a glass run channel into a vehicle door module prior to its assembly into the vehicle door is not always possible.

SUMMARY OF THE INVENTION

The present invention provides a mechanism for pre-assembling a glass run channel to a vehicle door module in a manner such that it does not inhibit installation of the module in a vehicle door or the assembly of other components into the vehicle door after the module has been inserted. The invention therefore, broadens the range of applications wherein a door module with a preattached glass run channel may be used.

The glass run channel according to the present invention is carried in a shipping position close to the mounting plates and structural elements of the module such that insertion of the module into a vehicle door is facilitated and the application of other components into the vehicle door is not inhibited. Subsequent to insertion of the module into the vehicle door, its attachment thereto and if necessary, the assembly of other components into the vehicle door, the glass run channel according to the present invention is released from its shipping position and pivoted to its operative position and fixed therein.

By pre-assembling the glass run channel to the module, the assembly of the channel into the vehicle door is facilitated without inhibiting the installation of other vehicle door components. The channel is dimensionally located in relation to the rest of the module and therefore, does not rely on the vehicle door structure for proper positioning. The pivot feature can be added to the module and the glass run channel as separate components or can be integrally molded therewith.

DETAILED DESCRIPTION OF THE PRESENTLY PREFERRED EMBODIMENT

Figure 1:
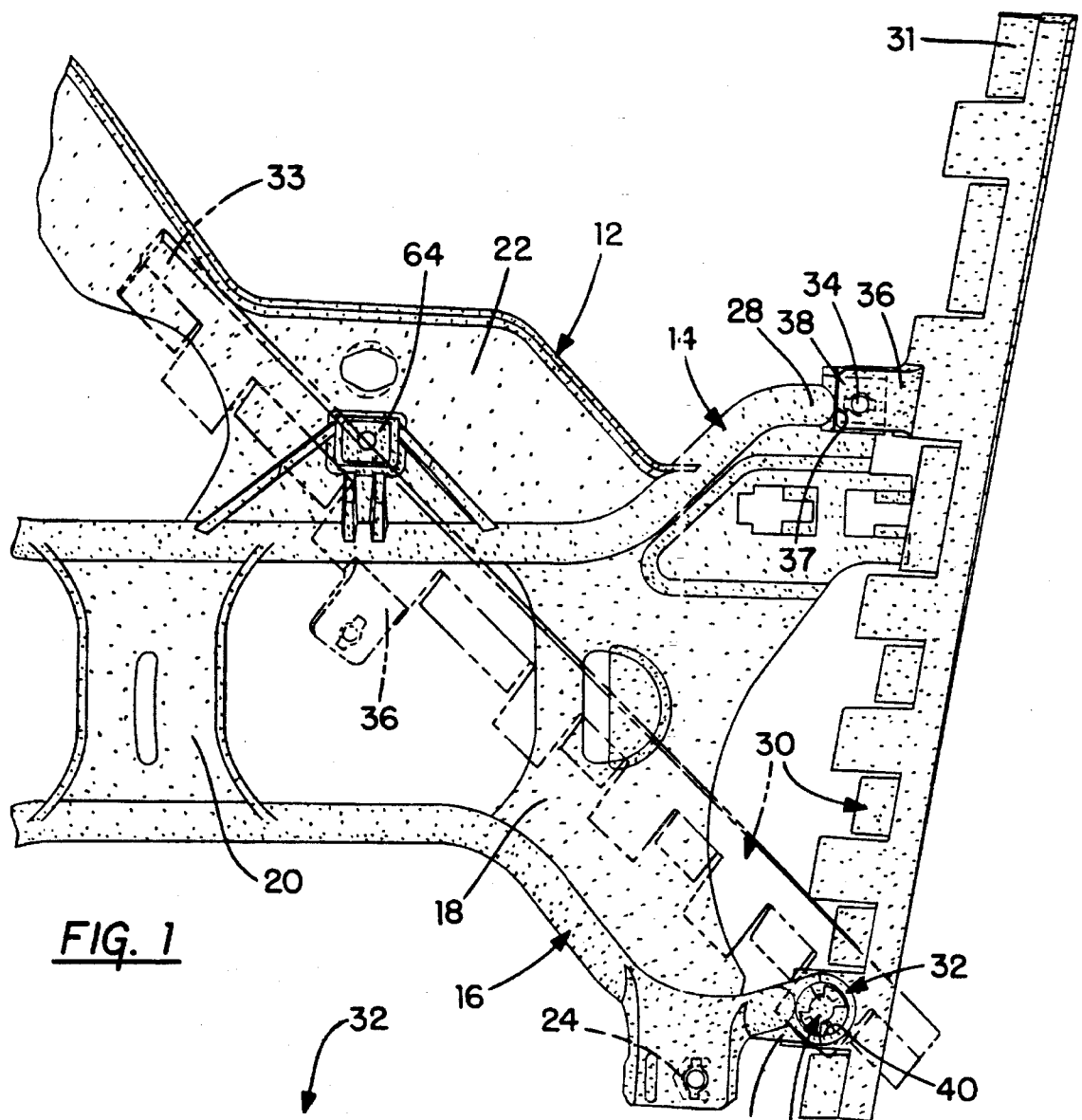
FIG. 1 is a fragmented view of a door module and pivoting below belt glass run channel assembly.

Referring to FIG. 1, illustrated is a partial view of a vehicle door module panel designated generally as 12. The panel 12 comprises a network of structural elements such as structural elements 14 and 16 and mounting plates such as mounting plate 18, 20, and 22. The panel 12 provides a means of mounting various hardware components (not illustrated) into a modular unit for installation into a vehicle door during vehicle assembly. The panel 12 includes mounting features such as nut 24 for attaching the module to the vehicle door's structure.

Attached to panel 12 is pivoting glass run channel 30. Glass run channel 30 is shown in its operative position at 31 and in its shipping position in phantom at 33. The glass run channel 30 includes a leg 36 for attachment at mounting opening 34 to locator 38 near the end 28 of structural member 14. Pivoting glass run channel 30 also includes a means for mounting near the end 29 of structural element 16 at pivot joint 32.

Figure 2:
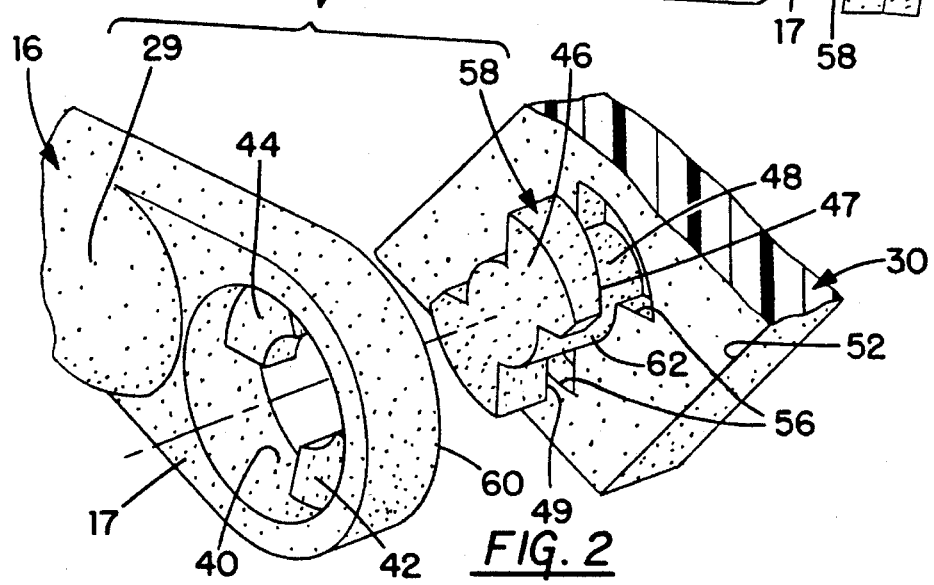
FIG. 2 is a detailed illustration of the pivot joint of the assembly illustrated in FIG. 1.

Pivot joint 32 is illustrated in greater detail in FIG. 2. The structural element 16 of panel 12 extends into a flattened segment 17 having a key way 40 therethrough. Ramps 42 and 44 are formed on the interior of key way 40, and are disposed in an opposed relationship across key way 40.

Glass run channel 30 includes integrally molded lock 58. Lock 58 includes bow tie shaped key 46 which is sized for insertion through key way 40. Integrally molded with key 46 is shaft 48, which extends from surface 52 of glass run channel 30.

The components of pivot joint 32 are designed such that they are manufacturable in a simple two-part die in which no slides are needed. Lock 58 is formed by molding key 46 and shaft 48 integrally with glass run channel 30. Opening 56 is provided to allow die features to pass through in forming key 46.

Pivot joint 32 is designed such that the joint is joined together by inserting lock 58 through key way 40 and rotating glass run channel 30 approximately ninety degrees relative to structural element 16 to its operative position 31. The shipping position 33 of glass run channel 30 is near fastener feature 64 and as shown in FIG. 1, is part way between the insertion position of lock 58 through key way 40 and the operative position 31 of glass run channel 30 such that the pivot joint will not become disassembled during shipping.

The glass run channel 30 is in-part, located and locked to the panel 12 by a datum scheme internal to the design of pivot joint 32. Surface 52 of glass run channel 30 locates against surface 60 of flattened segment 17 of panel 12 to orient the parts in one axial direction. The slightly conical surface 62 of shaft 48 locates the attaching parts in an additional two axial directions each oriented ninety degrees relative to the first axial direction. The ramps 42 and 44, in cooperation with cam surfaces 47 and 49 of the key 46, angularly locate the glass run channel 30 such that frictional engagement is provided to apply a slight counterclockwise bias to glass run channel 30 when properly located in the operative position 31.

After the panel 12 is mounted in a vehicle door and other hardware components are assembled into the door, as necessary, the glass run channel 30 is pivoted from its shipping position 33 to its operative position 31. The operative position 31 of the glass run channel 30 places the pivot joint 32 in a slightly flexed condition to eliminate rattles. The bias of glass run channel 30 counterclockwise operates to hold the leg 36 against locating step 37 of locator 38 until it is secured by a fastener (not illustrated), at mounting opening 34. Optionally, leg 36 and locator 38 are provided with mating snap features thus eliminating the need for ancillary fasteners.

The invention is adaptable to reverse the pivot joint 32 and mounting opening 34 such that the glass run channel 30 pivots about the end 28 of structural element 14. The pivoting glass run channel structure is applicable for use on one or both ends of a door module assembly.

What is claimed is:

1. A door module comprising:

a mounting panel;

a glass run channel pivotable between a first position and a second position;

a pivot joint connecting the glass run channel to the mounting panel with a key way including a ramp on the mounting panel which receives and mates with a key on the glass run channel; and a leg on the glass run channel that engages a locator on the mounting panel in a snap fitting manner due to a bias applied to the glass run channel by the pivot joint.

2. A door module comprising:

a mounting panel having first and second structural elements the first structural element terminating in a segment having a first pivot joint element and the second structural element terminating in a locator;

a glass run channel carried by the mounting panel including a second pivot joint element and a leg, the second pivot joint element pivotably engaging the first pivot joint element of the mounting panel and wherein the leg is selectively engageable with the locator such that the glass run channel is pivotable to a first position substantially within a side profile of the mounting panel and the glass run channel is selectively pivotable to a second position substantially outside the side profile of the mounting panel wherein the leg fixedly engages the locator.

3. A door module according to claim 2 wherein the locator includes a locating step and the first and second pivot joint elements interact to bias the leg against the locating step when the glass run channel is in the second position.

4. A door module according to claim 3 wherein the first and second pivot joint elements in cooperation with the leg and locator locate the glass run channel in the second position relative to the mounting panel.

5. A door module according to claim 2 wherein the mounting panel includes a feature that engages the glass run channel in the first position applying a sideways bias to releasably maintain the glass run channel in the first position.

6. A door module according to claim 2 wherein the glass run channel engages the mounting panel through a pivotable range of approximately 90 degrees.

\* \* \* \* \*